Patented Jan. 16, 1934

1,943,332

UNITED STATES PATENT OFFICE 1,943,332

METHOD OF CHLORIDIZING ORES BY MEANS OF FERRIC CHLORIDE

Thomas A. Mitchell, Denver, Colo., assignor to Lafayette M. Hughes, Denver, Colo.

No Drawing. Application December 30, 1930, Serial No. 505,579. Renewed August 17, 1933

26 Claims. (Cl. 75—67)

This invention relates to a method of chloridizing metallurgical ores and particularly those ores, such as sulfides, which contain difficultly chloridized materials.

It has been found heretofore that ferric chloride is capable under certain conditions of aiding in the conversion of ore metal compounds to chlorides. This has been accomplished, for example, by digesting an ore metal sulfide in a solution of ferric chloride into which chlorine gas is continually passed, and in this process the iron chloride appears to act as a carrier of chlorine by being reduced to the lower form by reaction with the sulfide and then reoxidized by the chlorine gas. This process has, however, proven to be uneconomical because of an enormous loss of the chlorine gas. It has also been suggested that ferric chloride could be used as a source of chlorine by heating it in an oxidizing atmosphere; but proper consideration has not been given to the fact that chlorine reacts with metal sulfides to produce sulfur chloride, which under oxidizing conditions forms sulfur trioxide with a resultant escape of chlorine from the zone of reaction. The available sulfate radical, represented by the sulfur trioxide, is capable of displacing chlorine from metal chlorides and of forming sulfates thereof. This results in the ore metal chloride being contaminated with its sulfate, as well as causing the operation to be expensive, inefficient and wasteful of chlorine. Moreover, if iron is present as an impurity in the ore, it also uses up chloride ions or chlorine gas, as well as tending to react with ore metals and form insoluble unchloridizable compounds, such as zinc ferrite. For such reasons as these the chloridizing processes as heretofore practiced have not given anywhere near 100% extraction of the ore metal values and they have not proven economical and satisfactory for commercial use.

In the course of my experimentation I have found that ferric chloride is a particularly efficient chloridizing reagent and that it may be used to chloridize the difficultly treated portion of an ore, provided the ore is properly prepared and if the ferric chloride treatment is so carried on as to prevent the formation of undesirable compounds, and particularly if this chloridizing reaction takes place in the presence of a reagent which will fix any available sulfate radical tending to combine with an ore metal value and form an insoluble sulfate therewith.

The primary object of my invention is therefore to overcome such difficulties as have been heretofore experienced in an attempt to chloridize various metallurgical ores, and to provide a simple and economical method involving the use of ferric chloride and equivalent metal chlorides for chloridizing various ore metals and to obtain a high conversion of the ore metal values to the chloride form.

With these and other objects in view, as will be apparent to one skilled in the art, this invention resides in the combination of steps of the process hereinafter described and set forth in the claims appended hereto.

In accordance with my invention, I have found that an ore material, prepared as herein described, may be efficiently chloridized if it is in an intimate and finely divided mixture with a metal chloride, such as ferric chloride, which is capable of chloridizing ore metal sulfides and other refractory compounds by serving as a source of chloride ion or nascent chloride when the mixture is heated in the presence of oxygen to a temperature at which the reagent metal chloride is not stable and under conditions whereby nascent chlorine gas is formed in intimate association with the ore particles. Moreover, as covered broadly by my application Serial No. 597,627 filed March 8, 1932, if the ore material contains a sulfide or results in the formation of sulfur or the sulfate radical which tends to form a sulfate of an ore metal value, then a particular feature of my invention involves carrying on this chloridizing process in the presence of a sulfur fixing reagent, and particularly an alkaline earth metal compound which is capable of reacting with any sulfur trioxide or available sulfate radical to form an insoluble alkaline earth metal sulfate, and thereby prevent the formation of the sulfate of the ore metal and permit it to be chloridized. As a further feature of this invention, as described in my prior application Serial No. 449,079 filed May 1, 1930, I propose to so treat the ore preliminarily as to convert it to a condition in which it may be easily chloridized. This involves two primary features. One is that of getting the ore into an open, porous and gas permeable condition, and the other involves the elimination of a considerable portion of the sulfur, if the ore being treated is a sulfide, so that the ferric chloride will be required to react with only a small amount of this difficultly treated material.

In order that this invention may be more fully understood, it will be explained in detail with reference to the treatment of a specific ore containing the compounds of zinc, lead and iron, which act differently during the various stages of the treatment. It is to be understood that various other metals, such as tin, copper, manganese, magnesium, silver, gold, etc., will react in accordance with the general formula and conditions hereinafter set forth. Assuming the ore therefore to be a mixture of zinc, lead and iron sulfides, together with the usual rock or gangue, I propose to treat this ore preliminarily, as by a roasting operation, to remove a considerable portion of the sulfur of the ore and preferably to reduce it to a low amount so that it will not form more than one or two to five percent of the ore metal values.

If the roasting operation is carried on in accordance with standard practice, it will result in the formation of lead sulfate, iron oxide, and both zinc oxide and zinc sulfate, and the ore particle will be hard and not easily permeated by the chloridizing reagent used in the later steps. It is therefore desirable, but not necessary from the broader aspects of my invention, that this roasting operation be carried on in the presence of an alkaline earth metal compound which is capable of combining with any available sulfate radical and form alkaline earth metal interspersed throughout the mass. A suitable reagent for this purpose is the oxide, hydroxide or carbonate of calcium, strontium or barium, and I preferably use calcium oxide or hydroxide for the purpose. This alkaline earth reagent should be added in excess of that amount determined to be sufficient to combine with all available sulfate radical not preferentially taken up by lead and similar metals which normally oxidize to the sulfate. Ordinarily, I prefer to have this reagent constitute about 10% of the ore mass so as to insure the formation of a large amount of alkaline earth metal sulfate. In the example given below, a much larger amount was found to give particularly good results.

I have found that by grinding the ore and lime to a finely divided condition, which may be accomplished in a ball mill in the presence of water, the calcium hydroxide thus formed tends to combine with any zinc sulfate already present in the ore to form calcium sulfate. During the subsequent roasting operation the calcium oxide or hydroxide is able to take up all available sulfate radical and so prevent the formation of sulfate of zinc or other metals which tend to go to both the oxide and the sulfate during roasting. If the ore which is to be chloridized does not contain a sulfide or sulfate, then for the purpose of rendering the ore material open and porous, I may add a sulfide, such as iron sulfide, or a sulfate, such as sulfuric acid, which is capable of reacting with the alkaline earth metal compound to produce the insoluble sulfate. This interspersed alkaline earth metal sulfate has the peculiar property of making the roasted material highly permeable to reagent solutions or gases. The roasted particles instead of being hard and obdurate, as would be the case if the lime were not present, is now found to be pulverulent or friable and to contain calcium sulfate crystals interspersed throughout the ore in such a way that the gases may pass along the parting planes between the crystals or into the pore spaces between the calcium sulfate and the ore particles. In this way, I provide a roasted material which may be very easily treated by the chloridizing reagent. It will be understood that the lead has gone to the sulfate form while the zinc and iron are oxidized by the roasting operation. Other ore metal compounds will react in a manner well understood in the art.

The roasting operation may be carried on in any suitable apparatus, such as a long inclined rotary tube heated at the lower end to a suitable temperature by an oxidizing flame. The tube is rotated by suitable mechanism, and it contains baffles for agitating and showering the material through the hot oxidizing gases. The temperature will depend on the type of ore employed, but it is noteworthy that the temperature may and should be kept as low as is consistent with the requirements for removing the sulfur from the ore. Ordinarily, I find that it is satisfactory to let a sulfide ore attain that temperature which the normal burning of the sulfides will produce. It may go as high as 1,000° C. for the ore herein described, but 600° to 800° C. will often suffice. By keeping the temperature low the formation of zinc ferrite and other difficultly chloridized substances is avoided, and the lime used with ore cannot and should not form a slag or otherwise act as a flux and form a vitreous or hard and obdurate mass. It will be understood that the roasting operation will be carried on in accordance with standard practice, except as modified by the requirements herein specified, to produce the maximum of oxide and the minimum of sulfate formed. However, the process need not be carried on in any extreme or expensive manner, since such sulfide or sulfate residues as remain can be taken care of properly in the subsequent chloridizing step, owing to the presence of the alkaline earth material which fixes such sulfur or sulfate as is released by the chlorine.

For the chloridizing reagent, I preferably utilize ferric chloride and this may be incorporated with the ore material in various ways. For example, I may use ferric chloride crystals ($FeCl_3, 6H_2O$) or the powdered anhydrous material, or if desired a solution of ferric chloride may be suitably incorporated with the roasted material, or the ferric chloride may be formed in situ from the ferric oxide derived in turn from the iron sulfide in the raw ore material, as by means of hydrochloric acid gas passed over the roasted ore. In order to determine the amount of ferric chloride to be added, it is necessary to calculate the amount of chlorine required to chloridize all of the convertible ingredients of the ore batch. Let us assume, for the sake of illustration, that the roasted material has an analysis of approximately the following parts:

| | Percent |
|---|---|
| Zinc oxide | 15 |
| Lead sulfate | 18 |
| Calcium oxide and calcium sulfate | 25 |
| Ferric oxide | 15 |
| Manganese dioxide | 1 |
| Magnesium oxide | 1 |
| Zinc sulfide | 1 |
| Zinc ferrite | 1 |
| Zinc silicate | 1 |

The amounts of zinc, manganese and magnesium are calculated as chlorides in order to determine the total amount of metal that is to be taken care of by the ferric chloride. For convenience, all of the metal requiring chlorine is considered as being zinc, and it is calculated that 100 lbs. of calcine require 15.3 lbs. of chlorine or 22.3 lbs. of anhydrous ferric chloride. If ferric chloride containing its water of crystallization is used, then of course an amount equal to the $6H_2O$ present in the crystals must be added. In order that there may be sufficient chlorine for carrying on the reaction I preferably employ an excess of this reagent, the amount of which may be varied as experience dictates.

Any suitable apparatus may be used for the chloridizing process, such as an inclined rotary kiln through which the powdered material is caused to pass in counter flow relation to the heat. The chamber may be heated by suitable means such as an electric resistance element or by a heated jacket surrounding the kiln which is arranged to carry a hot gas and cause heat to be conducted through the kiln wall to the ore material.

As this porous mixture of ore and ferric chloride passes into the chloridizer, the ferric chloride, if it has been added to the ore batch in a dry condition, tends first to give up its water of crystallization and to dissolve in this water as well as the other moisture present in the atmosphere of the chloridizing apparatus. This causes a solution of ferric chloride to flow into intimate contact with the ore particles and to react with such materials as zinc oxide which are easily chloridized. There is similarly a reaction between the zinc sulfide hearts of the ore particles with the ferric chloride in solid or gaseous state or in solution to form zinc chloride and ferrous chloride with free sulfur, this sulfur then being oxidized to sulfur trioxide in the presence of the ferric oxide which is present. The ferrous chloride thus formed may be reoxidized by the nascent chlorine present. Sulfur trioxide can do no harm since there is present an alkaline earth metal compound, such as a calcium chloride or oxide, ready to take it up and prevent it from combining with the zinc. Any hydrochloric acid or calcium chloride present will likewise react with zinc oxide to form zinc chloride.

As the material is progressively heated, the ferric chloride reaches its point of decomposition and in the presence of oxygen or air introduced for the purpose begins to give up nascent chlorine which attacks the chloridizable portions of the ore material. The decomposition of the ferric chloride proceeds according to the equation: $4FeCl_3 + 3O_2 = 2Fe_2O_3 + 6Cl_2$. The temperature of this reaction chamber at the exit end is maintained well above that at which the ferric chloride dissociates, which is around 100° C., and it is preferably kept at a temperature of between 250° and 300° C. in order that the reaction may take place rapidly. It is, moreover, desirable that there be a strong atmosphere of chlorine in this chamber or that a reasonably high concentration of this gas be provided, and for this purpose the ore and ferric chloride is confined within a chamber of comparatively small size.

As a result of the evolution of nascent chlorine, the residual zinc sulfide, as well as zinc ferrite, zinc silicate and other reactable materials present in the ore batch, will be converted to chlorides by the nascent chlorine. Moreover, any iron chloride which may have been formed in the upper end of the chamber by absorption of the chlorine or hydrochloric acid passing in a counterflow current over the ore material will be decomposed and caused to give up its chlorine and to go from the chamber as ferric oxide. The sulfur chloride and any free sulfur which may be formed from the ore metal sulfide will be oxidized to sulfur trioxide with the formation of hydrochloric acid. The calcium oxide or calcium chloride present in the material will react with the sulfur trioxide or any free sulfate radical present or formed when the ore metal sulfide is chloridized and thus fix the sulfur as an insoluble calcium sulfate and prevent it from releasing chlorine from the zinc chloride. The reaction of the sulfuric acid or sulfur trioxide with calcium chloride in the presence of moisture will set free hydrochloric acid, and this will be taken up by zinc and iron oxides, and any excess may be recovered, together with excess chlorine, in the upper end of the chloridizer or in a suitable absorber containing ore material where they serve to attack those compounds which are easily convertible to the chloride form.

If, as described in my copending application Serial No. 503,524, filed Dec. 19, 1930, and as claimed in my copending application Serial No. 687,827 filed September 1, 1933, the iron chloride is to be formed in situ from the iron oxide derived from the iron sulfide of the complex ore, or added for the purpose, this is readily accomplished by passing strong hydrochloric acid gas over the iron oxide within the ore mixture. If the ore material being treated contains zinc and ferric oxides, the weak gases from later stages of the process may be employed to chloridize the zinc oxide first, after which the treatment with hydrochloric acid gas will form ferric chloride. By maintaining a temperature, during the formation of the iron chloride, below that point at which iron chloride tends to dissociate under the conditions of its manufacture, and preferably below 90° C., the water produced by the reaction of the acid on ferric oxide is taken up as water of crystallization with the resultant formation of crystalline hydrated ferric chloride. This ferric chloride has the capacity under the prevailing conditions of the process of reacting directly with refractory compounds, such as zinc sulfide and the complex zinc, iron, sulfur and oxygen compounds, which may have been formed by the roasting operation, and of converting them to chlorides and itself being reduced to ferrous chloride. Such ferrous chloride as is thus formed will be caused to give up its chlorine and be converted to ferric oxide, when heated with air as above described.

Various procedures may be adopted for the purpose of providing the ore material with the required iron chloride, it being merely necessary, in so far as this invention is concerned, that one of the iron chlorides be formed within the ore material, or be added for the purpose, so that the residual sulfides and other refractory ore values may be chloridized thereby, and by gaseous reagents developed therefrom, which act in the presence of the alkaline earth material to form the sulfate free ore metal chloride.

If there is not enough of sulfur fixing reagent present, alkaline earth metal oxide or chloride may be added to the roasted batch for the purpose. This will be the case particularly if the roasting operation was carried on without the aid of the alkaline earth reagent, and if the material contains considerable zinc sulfate or other metal sulfates which can react with alkaline earth metal oxide to form a chloridizable material. Calcium oxide or chloride, for example, will react with the zinc sulfate and form zinc oxide or chloride and fix the sulfate ion as calcium sulfate. The amount to be added to the chloridizer will be determined by an analysis of the material to be treated for the available sulfur therein.

The product issuing from the lower end of the chloridizer will therefore be lead sulfate, zinc chloride, manganese chloride, magnesium chloride, calcium sulfate, ferric oxide and other compounds of the gangue. The main thing to be noted, however, is that all of the zinc has now been converted to zinc chloride and that it is in a soluble and easily recoverable form, while the iron and lead are in an insoluble condition and may therefore be readily separated from the soluble salts. If the calcium compound added has been properly calculated, there will be no excess of calcium chloride and all of the calcium will be in the form of the difficultly soluble sulfate.

The remaining steps of the process may be carried on in accordance with various well known methods. For example, the residue, after the zinc, manganese and magnesium chlorides have been dissolved from the chloridized product, may be leached with hot sodium chloride solution in order to extract the lead therefrom and this may then be recovered by cooling and causing precipitation of lead chloride crystals. Other ore ingredients may be recovered by suitable chemical methods.

Having thus described my invention, what I claim as new and desire to secure by Letters Patent is:

1. The method of chloridizing an ore material containing a chloridizable metal sulfide comprising the steps of providing an intimate mixture of the ore material with ferric chloride and heating the mixture with oxygen to a temperature at which said chloride is not stable and in the presence of sufficient material provided for the purpose which is capable of reacting with the available sulfate radical formed by oxidation of the sulfide sulfur to prevent the ore metal from going to the sulfate form.

2. The method of chloridizing an ore material containing a chloridizable metal sulfide comprising the steps of providing an intimate mixture of the ore material with ferric chloride and a compound of an alkaline earth metal provided for the purpose which is capable of reacting with available sulfate radical and heating the mixture under oxidizing conditions to a temperature at which ferric chloride is not stable and thereby forming an ore metal chloride and alkaline earth metal sulfate.

3. The method of chloridizing an ore material containing an ore metal sulfide comprising the steps of providing an intimate mixture of the ore material with iron chloride in amount sufficient to chloridize a desired ore metal value and with alkaline earth metal chloride added for the purpose which is capable of and is proportioned for fixing the available sulfate radical as an insoluble alkaline earth metal sulfate, heating the mixture with air to a temperature at which the iron chloride is not stable and forming ferric oxide and a gaseous chloridizing reagent, and causing the latter to react with and chloridize said sulfide in the presence of the alakline earth material, and thereafter dissolving the ore metal chloride and forming a solution thereof, substantially free from the sulfate radical.

4. The method of chloridizing an ore material containing iron oxide and a sulfur compound capable of developing the sulfate radical during the process comprising the steps of providing the ore material with sufficient alkaline earth metal compound, added for the purpose, which is capable of and proportioned for fixing the available sulfate radical as an insoluble sulfate, treating the mixture with a chloridizing agent to form iron chloride in situ, subsequently heating the material with air to convert any iron chloride present to ferric oxide and develop a gaseous chloridizing agent, causing the latter to chloridize ore values, and thereafter dissolving the soluble ore metal chloride from the ore residue which contains the insoluble alkaline earth metal sulfate.

5. The method of claim 4 in which the ore material contains ferric oxide and is treated with hydrochloric acid gas to form crystalline hydrated ferric chloride in intimate association with the ore material, and said chloride is caused to chloridize ore metal values in the presence of the alkaline earth material.

6. The method of treating a sulfide ore comprising the steps of making a finely divided intimate mixture of the ore and an alkaline earth metal compound capable of and proportioned for fixing the available sulfate radical, roasting the mixture under conditions which cause the formation of an ore metal oxide and alkaline earth metal sulfate interspersed therewith, and thereafter heating the ore material with ferric chloride in the presence of oxygen at a temperature at which ferric chloride is not stable.

7. The method of treating a sulfide ore comprising the steps of mixing the ore in a finely divided condition with an alkaline earth metal oxygen compound which is capable of and is proportioned for fixing all of the available sulfate radical as an insoluble sulfate, roasting the mixture, then providing a pulverulent, substantially dry mixture of the ore with iron chloride and heating said mixture with oxygen to a temperature in excess of 100° C. at which the iron chloride is converted to the oxide and a gaseous chloridizing agent containing the chlorine atom is produced in intimate association with the ore and the sulfate radical rendered available during the process is fixed as an insoluble alkaline earth metal sulfate.

8. The method of treating an ore comprising the steps of mixing the ore in finely divided condition with an alkaline earth metal compound and a material providing available sulfate radical which are capable of uniting to form alkaline earth metal sulfate interspersed throughout the roast, roasting the mixture, and subsequently heating the roast in the presence of ferric chloride, oxygen and an alkaline earth metal compound capable of and proportioned for reacting with any available sulfate radical to form alkaline earth metal sulfate, while maintaining a temperature at which said chloride is not stable, so that chlorine is provided to chloridize difficulty chloridized ingredients of the ore.

9. The method of treating a sulfide ore comprising the steps of roasting the ore, then chloridizing the easily chloridizable portions thereof, providing an intimate mixture of the roasted material with ferric chloride, and subsequently heating the mixture with oxygen to a temperature at which the ferric chloride is not stable and in the presence of an alkaline earth metal compound added for the purpose which is capable of and proportioned for uniting with all of the available sulfate radical.

10. The method of treating a chloridizable ore material containing an ore metal sulfide comprising the steps of adding to the ore material a quantity of ferric chloride proportioned to supply the required chlorine content, making a finely divided intimate mixture of the same with an alkaline earth metal compound capable of fixing any available sulfate radical, and then heating the mixture in the presence of oxygen to a temperature at which chlorine will be evolved from said ferric chloride and forming a chloride of an ore metal and a sulfate of said alkaline earth metal.

11. The method of treating a chloridizable ore material containing the oxide and sulfide of an ore metal comprising the steps of adding ferric chloride to the ore material in quantity sufficient for the chloridizing operation and sufficient calcium compound which will react with all available sulfate radical to form calcium sulfate, making a finely divided intimate mixture of the same, then heating the mixture in the presence of oxygen to a temperature at which chlorine will be evolved and causing the conversion of the ore metal sulfide to a chloride and the production of calcium sulfate from the available sulfate radical.

12. The method of chloridizing a metallurgical ore of low iron content containing a chloridizable metal sulfide comprising the steps of roasting the ore under conditions which produce an oxide of said sulfide and subsequently mixing the roasted material with iron chloride proportioned to supply chlorine to all chloridizable material and with an alkaline earth metal compound capable of and proportioned for fixing the available sulfate radical as an insoluble metal sulfate and heating the mixture with air to a temperature at which ferric chloride is not stable so as to convert the iron chloride to ferric oxide and nascent chlorine.

13. The method of chlorinating an ore material of low iron content containing zinc oxide and a difficultly chloridized compound comprising the steps of mixing the ore with an alkaline earth metal compound capable of and proportioned for reacting with the available sulfate radical and with ferric chloride and converting zinc compounds to zinc chloride by direct reaction with the reagent in the presence of water at a temperature below the decomposition point of the ferric chloride, then raising the temperature to a point at which ferric chloride is not stable while maintaining oxidizing conditions and causing the evolution of nascent chlorine and the conversion of difficultly chlorinated compounds to the chloride form.

14. The method of chloridizing a metallurgical ore of low iron content comprising the steps of roasting the ore in pulverized condition to form ore metal oxide and a difficultly chloridized ore metal compound, then mixing the roast with ferric chloride and causing it to chloridize the metal compounds in the presence of water, and thereafter heating the partially treated material in an oxidizing atmosphere and causing the evolution of nascent chlorine and the production of iron oxide and the chloridization of difficultly treated ore material.

15. The method of chloridizing a metallurgical sulfide ore comprising the steps of roasting the ore in a pulverized condition to produce an ore metal oxide, mixing the roast with a solution of ferric chloride and with an alkaline earth metal compound capable of fixing the available sulfur and causing the chloridization of a portion of the ore at a low temperature, and thereafter heating the mass to a temperature at which ferric chloride is not stable while maintaining oxidizing conditions and causing the evolution of nascent chlorine and the further chloridization of the ore, with the formation of alkaline earth metal sulfate.

16. The method of chloridizing a metallurgical sulfide ore comprising the steps of making a finely divided mixture of the ore material with an alkaline earth metal compound capable of reacting with available sulfate radical, roasting the ore to convert a large portion of an ore metal sulfide to the oxide form and to form alkaline earth metal sulfate interspersed throughout the roasted material, mixing sufficient ferric chloride with said roasted material to chloridize the same and heating it under oxidizing conditions to a temperature at which the ferric chloride is not stable and causing the evolution of chlorine and the chloridization of an ore metal value and the formation of alkaline earth metal sulfate from the available sulfate radical.

17. The method of treating a metallurgical sulfide ore comprising the steps of roasting the ore with an alkaline earth metal oxide in finely divided condition to form a gas permeable pulverulent material containing ore metal oxide, mixing the roast with ferric chloride in amount calculated to provide chlorine for all of the chloridizable material, causing the formation of a solution of said chloride and its reaction with the metal compounds, and thereafter raising the temperature to a point at which ferric chloride is not stable while maintaining oxidizing conditions and causing the further chloridization of the ore material.

18. The method of treating an ore material which contains a chloridizable metal sulfide comprising the steps of providing an intimate mixture of the ore material with an alkaline earth metal compound capable of and proportioned for fixing the available sulfate radical as an insoluble alkaline earth metal sulfate, adding to the ore material a solution of iron chloride proportioned to supply the required chlorine content, and thereafter heating the mixed ingredients with an excess of oxygen to a temperature at which the iron chloride is caused to produce nascent chlorine in intimate contact with the ore material and to leave the iron in the form of ferric oxide.

19. The method of treating an ore material of low iron content which contains a metal sulfide comprising the steps of providing an intimate mixture of the ore material with an alkaline earth metal compound capable of and proportioned for fixing the available sulfate radical as an insoluble alkaline earth metal sulfate, adding to the ore material a solution of iron chloride proportioned to supply the required chlorine content, heating the ore material in a counterflow current of hot gases and gradually raising the temperature to a point at which the iron chloride is not stable, while passing an excess of oxygen over the ore material, thereby minimizing the presence of water in the ore material and causing the formation and nascent chlorine and ferric oxide from said iron chloride.

20. The method of chloridizing a sulfide ore of low iron content, comprising the steps of partially roasting it under low temperature conditions and providing a roast containing residual sulfides, adding to the ore material a solution of iron chloride proportioned to supply the required chlorine content, providing an intimate mixture of the ore material with an alkaline earth metal compound capable of and proportioned for fixing all of the available sulfate radical as an insoluble alkaline earth metal sulfate, and heating the mixture in the presence of an excess of oxygen to a temperature at which the iron chloride is not stable and forming ferric oxide and nascent chlorine therefrom, while passing a current of air in a counterflow current over the ore material.

21. The method of chloridizing an ore material containing a metal sulfide comprising the steps of causing a solution of ferric chloride to permeate the substantially dry ore material and thereafter heating the dry material in intimate mixture with an alkaline earth metal compound which is capable of and has been added in proportion for fixing as an insoluble sulfate the available sulfate radical derived from the ore, while supplying air and raising the temperature to a point at which the ferric chloride will be converted to ferric oxide and a gaseous chloridizing agent.

22. The method of treating a metallurgical ore containing sulfides of iron and a valuable ore metal comprising the steps of roasting the ore under oxidizing conditions, treating the roasted ore with chloridizing gases derived from a later stage, and subsequently heating the ore mixed with ferric chloride in the presence of air and a compound of an alkaline earth metal added for the purpose, which is capable of and proportioned for fixing the available sulfate radical as an insoluble compound, and maintaining a temperature at which the ferric chloride is not stable, so as to form nascent chlorine which reacts with the residual ore metal sulfide to form a chloride thereof.

23. The method of treating an ore containing sulfides of iron and another ore metal comprising the steps of roasting the ore under oxidizing conditions to form ferric oxide, passing hydrochloric acid gas over the roasted material and forming ferric chloride therein, and subsequently heating the mass containing ferric chloride with oxygen to a temperature at which the ferric chloride is not stable and in the presence of an alkaline earth metal compound added for the purpose which is capable of and proportioned for fixing the available sulfate radical as an insoluble compound.

24. The method of treating a metallurgical ore containing the sulfides of iron and another ore metal comprising the steps of mixing the ore with sufficient alkaline earth metal compound to form a sulfate with any available sulfate radical, roasting the mixture under oxidizing conditions and producing a gas permeable mass containing oxides of iron and of an ore metal interspersed with alkaline earth metal sulfate, then passing a chloridizing gas containing hydrochloric acid over the roasted material to form chlorides of iron and said ore metal, subsequently heating the mixture in the presence of air and an alkaline earth metal compound capable of fixing the available sulfate radical, and maintaining a temperature at which ferric chloride is not stable and thereby chloridizing the remainder of the ore metal sulfide.

25. The method of treating a metallurgical ore containing sulfides of iron and an ore metal of the chloridizable group comprising the steps of first roasting a finely divided mixture of lime and the ore under conditions which produce a gas permeable pulverulent material containing iron oxide and a considerable amount of ore metal oxide interspersed with calcium sulfate and a small amount of metal sulfide, treating the roasting material with a chloridizing gas to form ferric chloride while maintaining temperature conditions at which the ferric chloride is stable and thereafter heating the mixture with oxygen and a sulfur fixing agent to a temperature at which the ferric chloride is not stable and causing the evolution of chlorine and the chloridization of residual metal sulfide remaining in the material.

26. The method of chloridizing an ore containing the sulfides of iron and a metal of the chloridizable group comprising the steps of mixing the ore with calcium hydroxide and roasting the ore under condition which produce iron oxide and a considerable proportion of the oxide of the said metal as well as a small residuum of metal sulfide, which are interspersed with calcium sulfate formed during the roasting operation, treating the ore mixture with hydrochloric acid gas to form the chloride of the group metal and ferric chloride, and subsequently heating the mixture in an oxidizing atmosphere to a temperature at which the ferric chloride is not stable and in the presence of a compound of calcium which causes the remaining group metal sulfide to be chloridized with the further formation of calcium sulfate from the sulfur of said sulfide.

THOMAS A. MITCHELL.